United States Patent
Thies et al.

(10) Patent No.: US 9,862,226 B2
(45) Date of Patent: Jan. 9, 2018

(54) COMPONENT FOR WRITING, DRAWING, PAINTING AND/OR COSMETIC IMPLEMENTS AND METHOD FOR THE PRODUCTION THEREOF

(71) Applicant: J.S. Staedtler GmbH & Co. KG, Nürnberg (DE)

(72) Inventors: Andreas Thies, Effeltrich (DE); Konstantin Czeschka, Buckenhof (DE); Alexander Vyhnal, Nürnberg (DE)

(73) Assignee: STAEDTLER MARS GMBH & CO. KG, Nürnberg (DE)

( * ) Notice: Subject to any disclaimer, the term of this patent is extended or adjusted under 35 U.S.C. 154(b) by 2 days.

(21) Appl. No.: 14/759,794

(22) PCT Filed: Jan. 8, 2014

(86) PCT No.: PCT/EP2014/000017
§ 371 (c)(1),
(2) Date: Jul. 8, 2015

(87) PCT Pub. No.: WO2014/114421
PCT Pub. Date: Jul. 31, 2014

(65) Prior Publication Data
US 2015/0367673 A1    Dec. 24, 2015

(30) Foreign Application Priority Data
Jan. 23, 2013 (DE) .................... 10 2013 001 495

(51) Int. Cl.
*B43K 19/14* (2006.01)
*B43K 8/00* (2006.01)
(Continued)

(52) U.S. Cl.
CPC .............. *B43K 19/14* (2013.01); *A45D 40/20* (2013.01); *A45D 40/261* (2013.01);
(Continued)

(58) Field of Classification Search
CPC ......... B43K 19/02; B43K 19/14; A45D 40/20
(Continued)

(56) References Cited

U.S. PATENT DOCUMENTS 1,892,508 A * 12/1932 Gonzalez ............... B43K 19/02
                                                                401/96
1,920,361 A *  8/1933 Daneke ................. B43K 19/18
                                                                144/329
(Continued)

FOREIGN PATENT DOCUMENTS

CA    2062381 C    2/1995
DE    69200023 T2    5/1994
(Continued)

*Primary Examiner* — David Walczak
*Assistant Examiner* — Joshua Wiljanen
(74) *Attorney, Agent, or Firm* — Lucas & Mercanti, LLP; Klaus P. Stoffel

(57) ABSTRACT

The invention relates to a component for writing, drawing, painting and/or cosmetic implements for receiving at least one application medium, the component comprising at least one sleeve, which is made of a polymer-bonded wood substitute substance and which has an inner sleeve wall and an outer sleeve wall, the component further having at least one migration blocking layer, the at least one migration blocking layer directly or indirectly covering the inner sleeve wall of the at least one sleeve.

16 Claims, 2 Drawing Sheets

(51) Int. Cl.
*B43K 19/16* (2006.01)
*B43K 7/00* (2006.01)
*A45D 40/26* (2006.01)
*A45D 40/20* (2006.01)
*B29C 47/00* (2006.01)
*B29C 47/06* (2006.01)
*B43K 7/08* (2006.01)
*B29L 23/00* (2006.01)
*B29L 31/00* (2006.01)

(52) U.S. Cl.
CPC ........ *B29C 47/0023* (2013.01); *B29C 47/065* (2013.01); *B43K 7/005* (2013.01); *B43K 7/08* (2013.01); *B43K 8/003* (2013.01); *B43K 19/16* (2013.01); *B29L 2023/225* (2013.01); *B29L 2031/725* (2013.01)

(58) Field of Classification Search
USPC .......................................................... 401/96
See application file for complete search history.

(56) References Cited

U.S. PATENT DOCUMENTS

| | | | |
|---|---|---|---|
| 4,230,655 | A | 10/1980 | Krückel et al. |
| 5,039,519 | A | 8/1991 | Inoue et al. |
| 6,572,295 | B1* | 6/2003 | Chochoy ................ B43K 19/16 156/244.12 |
| 6,837,637 | B1 | 1/2005 | Beck et al. |
| 8,188,175 | B2 | 5/2012 | Lins et al. |
| 8,747,003 | B2 | 6/2014 | Thies et al. |
| 8,845,220 | B2 | 9/2014 | Thies |
| 2012/0237708 | A1 | 9/2012 | Caviezel et al. |

FOREIGN PATENT DOCUMENTS

| | | |
|---|---|---|
| DE | 20314274 U1 | 5/2004 |
| DE | 102006046491 A1 | 4/2008 |
| DE | 102006058485 A1 | 6/2008 |
| DE | 102008034015 A1 | 1/2010 |
| EP | 249993 A1 | 9/2012 |
| EP | 2313462 B1 | 12/2012 |

* cited by examiner

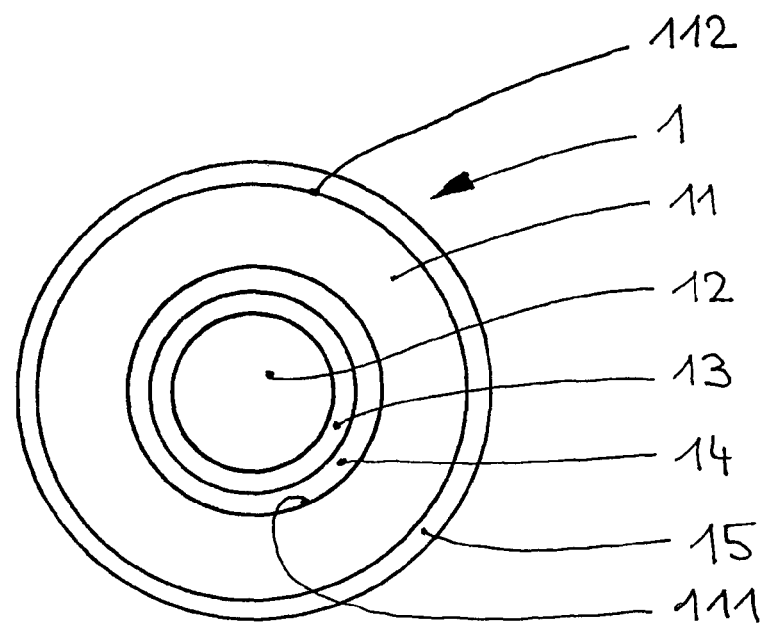
Figur 1
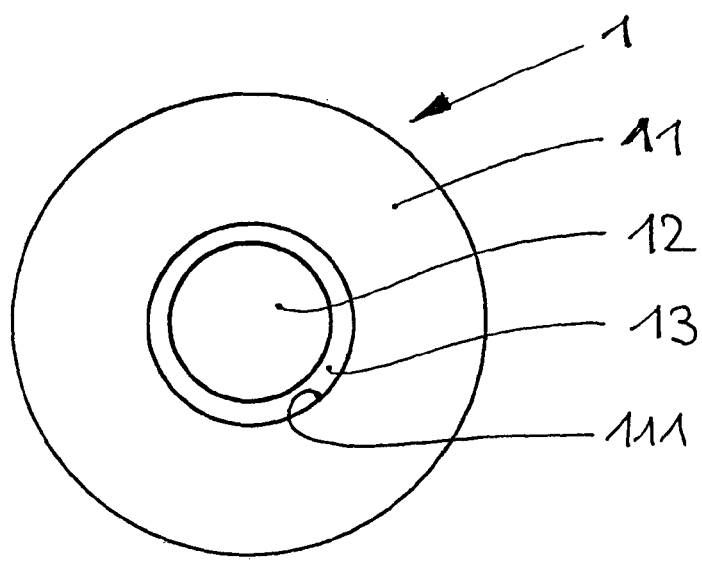
Figur 2

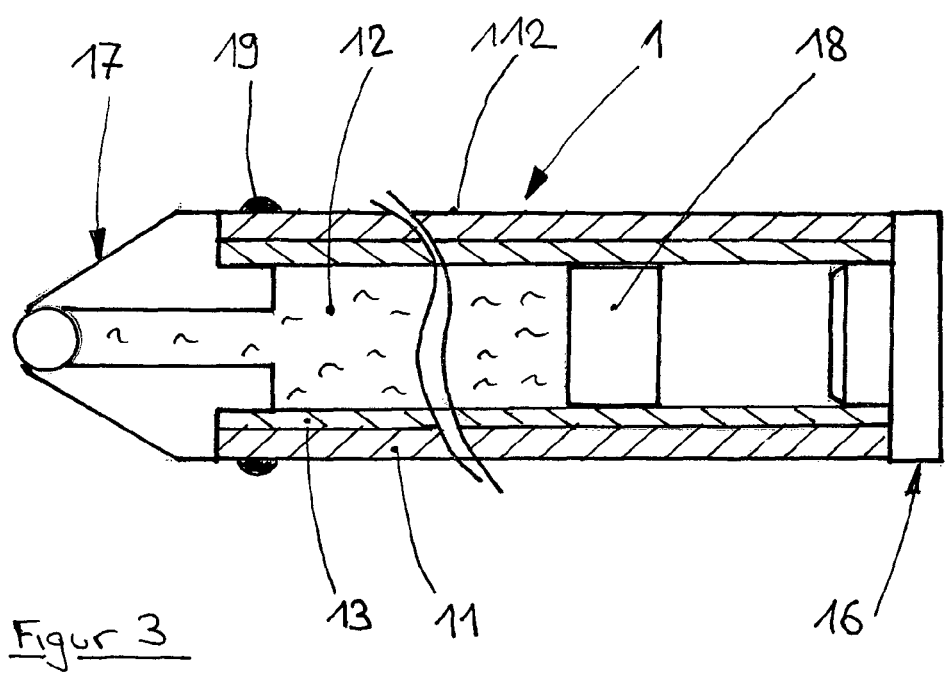
Figur 3

COMPONENT FOR WRITING, DRAWING, PAINTING AND/OR COSMETIC IMPLEMENTS AND METHOD FOR THE PRODUCTION THEREOF

The present application is a 371 of International application PCT/EP2014/000017, filed Jan. 8, 2014, which claims priority of DE 10 2013 001 495.6, filed Jan. 23, 2013, the priority of these applications is hereby claimed and these applications are incorporated herein by reference.

BACKGROUND OF THE INVENTION

The invention relates to a component for writing, drawing, painting and/or cosmetic implements according to the preamble of the main claim, and also to a method for the production thereof, and also to a writing, drawing, painting and/or cosmetic implement.

The term components will be understood hereinafter to mean shafts, cartridges, casings for leads, closure caps and/or covers. Implement components of this type are known in principle.

The function of these components is to receive or surround liquid, pasty and/or solid application media.

By way of example, wood-cased implements, in which a lead is encased or sheathed by natural wood, have long been known. In application materials such as leads and the like, migrating constituents such as pigments, plasticisers, oils and/or wax may be contained, of which the migration capability is dependent inter alia on temperature and concentration. Migration is understood to mean an undesired movement of constituents in a substance. Here, lead constituents migrate into adjacent layers.

It is also considered to be disadvantageous that in recent years the price for quality high-grade woods has risen enormously due to the lack of availability of wood, which has a direct effect on the production costs of the implements. As alternatives to the wood-cased implements described in the introduction, implements of which the casing comprises sharpenable foamed or unfoamed polymer extrudates made of polystyrene (PS), polyvinyl chloride (PVC), polypropylene (PP) and polyethylene (PE) are known from the prior art. Since implement casings of this type consist of practically 100% polymer, implements of this type are unacceptable from an ecological point of view.

This ecological viewpoint also concerns shafts of ballpoint writing implements, ink writing implements and/or ink cartridges.

Furthermore, implements with lead casings made of what are known as wood-plastic composites (WPCs) are known from DE 10 2008 034 015 A1.

It has proven to be disadvantageous, however, that irreversible damage occurs in the case of porous and/or infiltratable lead casings due to the migration of lead components, said damage including, for example, discoloration, strength reductions and soiling of the surface. Furthermore, constituents that may be necessary for the intended use are also removed from the migrating medium during migration, thus harming the general application of the product or even making the product useless.

SUMMARY OF THE INVENTION

The object of the invention is therefore to create a component for writing, drawing, painting and/or cosmetic implements that ensures that implements which contain the component do not demonstrate any quality reduction over a long period of time and also at increased temperature, irrespective of whether the application medium containing the migrating constituents is liquid, pasty or solid.

A further object of the present invention is to create a method for producing components of this type.

The component structured in accordance with the invention for writing, drawing, painting and/or cosmetic implements for receiving at least one application medium has at least one sleeve made of at least one polymer-bonded wood substitute substance (WPC), wherein the sleeve has an inner sleeve wall and an outer sleeve wall. In addition, the component structured in accordance with the invention has at least one migration blocking layer, wherein the at least one migration blocking layer directly or indirectly covers the inner sleeve wall of the at least one sleeve.

If the at least one migration blocking layer covers the sleeve wall indirectly, the component according to the invention thus also has at least one adhesion promoter layer, which covers the inner sleeve wall directly and is arranged between the sleeve and the at least one migration blocking layer.

At least one adhesion promoter layer is then formed when the polymers of the at least one wood substitute substance of the at least one sleeve and the polymers of the at least one migration blocking layer are incompatible.

The adhesion promoter here couples on the one hand to the at least one polymer of the at least one wood substitute and on the other hand to the at least one polymer in the migration blocking layer. A fixed and permanent connection between the at least one migration blocking layer and the at least one wood substitute substance is thus produced.

The at least one migration blocking layer can be formed for example from a polyolefin, in particular polyethylene (PE) and/or polypropylene (PP) or polyethylene terephthalate (PET) or polyvinyl chloride (PVC) or styrene polymers, such as polystyrene (PS), styrene acrylonitrile (SAN) and acrylonitrile butadiene styrene (ABS).

The migration blocking layer is coordinated here with the polarity of the application medium to be received.

The at least one migration blocking layer has a layer thickness of less than 2 mm. The at least one adhesion promoter layer can consist of a copolymer, a block polymer, a graft polymer or a polymer mixture formed of one or more polymers. The layer thickness of the adhesion promoter layer lies in the range from 0.01 mm to 1 mm.

The outer sleeve wall can be covered at least in part with at least one decorative layer, which is formed from polymers or polymer compounds and/or paints and/or films.

Furthermore the outer sleeve wall may have a three-dimensional structure or three-dimensional structures at least in part or in sub-regions. The structure or structures can be arranged directly on the outer sleeve wall and/or on the decorative layer covering the outer sleeve wall.

The component according to the invention will be presented and explained in greater detail hereinafter with reference to FIGS. 1 to 3.

BRIEF DESCRIPTION OF THE DRAWING

FIG. 1: plan view of the tip of a cosmetic implement;
FIG. 2: plan view of the tip of a colouring implement;
FIG. 3: Ballpoint writing implement in side view with shaft illustrated in section

DETAILED DESCRIPTION OF THE INVENTION

The implement according to FIG. 1 shows a cosmetic implement in the form of an eyeliner, consisting of a sleeve 11, an application medium 12, a migration blocking layer 13, an adhesion promoter layer 14 and a decorative layer 15. The application medium 12 in the form of a soft lead is composed for example as described in U.S. Pat. No. 5,039,519, Example 1. As a result of the migration blocking layer 13 it is possible to prevent pigments, for example "yellow iron oxide" from migrating into the wood substitute/sleeve 11. In order to prevent a migration of these constituents in the sleeve/wood substitute 11 direction, a migration blocking layer 13 is arranged between the application medium 12 and wood substitute 11.

An adhesion promoter layer 14 is additionally arranged between the inner sleeve wall 111 of the sleeve 11 and the migration blocking layer 13, since the polystyrene (PS) of the migration blocking layer 13 is incompatible with the polyolefin (PE-HD) of the wood substitute/sleeve 11. The migration blocking layer 13 covers the inner sleeve wall 111 of the sleeve 11 only indirectly.

The adhesion promoter 14 is in this case a styrene butadiene copolymer (SB). A fixed coupling between the incompatible polymers is ensured by the adhesion promoter or the adhesion promoter layer.

The decorative layer 15, which is applied to the outer sleeve wall 112, is present in this embodiment as a coloured WPC.

Example formulation for the wood substitute according to FIG. 1/embodiment 1:

| | |
|---|---|
| polyolefin (PE-HD) | 20.0% by weight |
| wood powder | 70.0% by weight |
| polypropylene with grafted maleic acid anhydride | 1.0% by weight |
| amide wax | 3.0% by weight |
| stearic acid | 1.0% by weight |
| boron nitride | 5.0% by weight |

What is not illustrated is a variant in which the sleeve (11) is formed from at least two different wood substitute substances that differ in terms of their colouration and/or mechanical properties.

FIG. 2 shows an implement 1 in the form of a wood-cased colouring implement, which contains a solid lead as application medium 12. The lead 12 is surrounded by a migration blocking layer 13 and a sleeve 11. The migration blocking layer 13 and also the wood substitute substance/sleeve 11 have a polyolefin (PE) as polymeric binder, which means that in this embodiment no adhesion promoter layer (14) has to be formed, since the problem of incompatible polymers is eradicated. A fixed coupling/connection between migration blocking layer 13 and sleeve 11 is thus ensured even without an adhesion promoter layer.

The migration blocking layer 13 covers the inner sleeve wall 111 directly in this embodiment.

An example formulation for the wood substitute according to FIG. 2/embodiment 2 may be composed as follows, by way of example:

| | |
|---|---|
| high density polyethylene (PE-HD) | 25.0% by weight |
| wood powder | 65.0% by weight |
| polyethylene with grafted maleic acid anhydride | 2.0% by weight |
| amide wax | 3.0% by weight |
| stearic acid | 3.0% by weight |
| titanium dioxide | 2.0% by weight |

The wood substitute specified in the exemplary embodiments /FIGS. 1 and 2 can assume various forms. By way of example, reference is made to forms according to EP 2 313 462 B1.

A wood substitute substance that is composed in accordance with the following framework formulation has proven to be particularly advantageous.

| | |
|---|---|
| 15-30% by weight | at least one polymeric binder |
| 50-80% by weight | at least one organic filler |
| 0-20% by weight | at least one inorganic filler |
| 0.5-5 % by weight | at least one adhesion promoter |
| 1-30% by weight | at least one wax |
| 0-10% by weight | at least one colour pigment, and |
| 0-10% by weight | at least one additive |

In addition, it has proven to be advantageous when the binder is selected from the group of polyolefins.

It has been found surprisingly that the sharpenability of implements according to FIGS. 1 and 2 is not, or is hardly altered/impaired, since the blocking layer does not have to be shaped and/or formed thick.

A further exemplary embodiment is shown and described in greater detail in FIG. 3.

FIG. 3 shows am implement 1 in the form of a ballpoint writing implement, which has a component according to the invention in the form of a shaft, which is composed of a sleeve 11 and a migration blocking layer 13. The shaft is closed at one end by a tip unit 17 and at the other end by a closure stopper 16.

The receiving space thus formed surrounds the application medium 12 tightly, also tightly against migrating constituents of the application medium 12.

At the tip end the application medium 12 is present in the form of a ballpoint ink paste, wherein a backflow of the paste is prevented by the follower 18.

Ballpoint ink pastes contain substances that are capable of migration and that would infiltrate or migrate into the wood substitute/sleeve 11 without forming a migration blocking layer 13.

In this embodiment three-dimensional structures 19 are arranged on the outer sleeve wall 112.

A method for producing components of this type can be carried out as described hereinafter. In particular the method of co-extrusion delivers excellent results for this purpose.

The different constituents of the component, consisting of migration blocking layer, wood substitute substance and optionally adhesion promoter are each melted separately from one another in an extruder;

The viscous melts are then fed to a common tool;

In the tool the individual constituents are geometrically pre-shaped, combined and discharged together;

After leaving the tool the endless strand/hollow profile thus extruded is cooled and solidified in the desired geometry;

The endless strand is separated at the end of the cooling, the parts produced hereby correspond to the components according to the invention;

These components can be fed, where appropriate, to subsequent units, such as decoration and/or assembly units.

The components are used in writing, drawing, painting and/or cosmetic implements. With implements of this type the at least one application medium is present at ambient temperature in liquid, pasty or solid aggregate state, wherein the application medium at least partially fills the cavity surrounded by the at least one migration blocking layer.

The component according to the invention can be used in wood-cased implements with leads, such as lead pencils and colouring implements, fibre pens filled with ink, and/or ballpoint implements filled with paste or gel.

In the cosmetics field, the component can be used in what are known as eyeliners, eyebrow pencils and/or lip liners.

The outer contour of the component can be round, oval, ellipsoidal, polygonal and/or star-shaped in all applications or uses. Here, a large number of forms of the outer contour are possible on account of the extrusion method.

POSITION LIST 1 writing, drawing, painting and/or cosmetic implement
11 sleeve
111 inner sleeve wall
112 outer sleeve wall
12 application medium
13 migration blocking layer
14 adhesion promoter layer
15 decorative layer
16 closure stopper
17 tip unit
18 follower
19 three-dimensional structure/structures

The invention claimed is:

1. A component for a fibre pen filled with ink and/or ballpoint pen implements filled with paste or gel, wherein the component comprises: at least one sleeve made of at least one polymer-bonded wood substitute substance containing an organic filler material, the sleeve having an inner sleeve wall and an outer sleeve wall; and at least one migration blocking layer, wherein the at least one migration blocking layer directly or indirectly covers the inner sleeve wall of the at least one sleeve so as to block migration of the ink, paste or gel into the at least one sleeve, wherein the wood substitute substance comprises,

| | |
|---|---|
| 15-30% by weight | at least one polymeric binder, |
| 50-80% by weight | at least one organic filler, |
| 0-20% by weight | at least one inorganic filler, |
| 0.5-5 % by weight | at least one adhesion promoter, |
| 1-30% by weight | at least one wax, |
| 0-10% by weight | at least one colour pigment, and |
| 0-10% by weight | at least one additive. |

2. The component according to claim 1, wherein the at least one migration blocking layer indirectly covers the inner sleeve wall of the at least one sleeve, the component further comprising at least one adhesion promoter layer that directly covers the inner sleeve wall and is arranged between the at least one sleeve and the at least one migration blocking layer.

3. The component according to claim 2, wherein the at least one adhesion promoter layer is one of a copolymer, a block polymer, a graft polymer or a polymer mixture formed of at least one polymer.

4. The component according to claim 2, wherein the at least one migration blocking layer is a polyolefin or a styrene polymer, wherein the at least one adhesion promoter layer has a layer thickness in a range from 0.01 to 1 mm.

5. viously presented) The component according to claim 1, wherein the at least one migration blocking layer is a polyolefin or a styrene polymer.

6. The component according to claim 5, wherein the polyolefin is polyethylene (PE), polypropylene (PP), polyethylene terephthalate (PET) or polyvinyl chloride (PVC).

7. The component according to claim 5, wherein the styrene polymer is polystyrene (PS), styrene acrylonitrile (SAN) or acrylonitrile butadiene styrene (ABS).

8. The component according to claim 1, wherein the component has a round, oval, ellipsoidal, polygonal and/or star-shaped outer contour.

9. The component according to claim 1, wherein the at least one sleeve has a wall thickness in a range from 0.5 to 5 mm.

10. The component according to claim 1, wherein the at least one migration blocking layer has a layer thickness of less than 2 mm.

11. The component according to claim 1, wherein the outer sleeve wall is covered at least partially by a decorative layer.

12. The component according to claim 11, wherein the outer sleeve wall covered at least partially by a decorative layer has a three-dimensional structure at least in part.

13. The component according to claim 11, wherein the at least one decorative layer is formed from polymers or polymer compounds and/or paints and/or films.

14. The component according to claim 1, wherein the outer sleeve wall has a three-dimensional structure at least in part.

15. The component according to claim 1, wherein the at least one sleeve is formed from at least two different wood substitute substances, which differ in terms of coloration and/or mechanical properties.

16. A writing, drawing, painting and/or cosmetic implement comprising: at least one application medium; and a component according to claim 1, wherein the at least one application medium is present at ambient temperature in liquid or solid aggregate state and at least partially fills a cavity surrounded by the at least one migration blocking layer.

* * * * *